US009357177B2

(12) United States Patent
Beattie et al.

(10) Patent No.: US 9,357,177 B2
(45) Date of Patent: May 31, 2016

(54) APPARATUS AND METHOD FOR PROVIDING A SURVEILLANCE SYSTEM

(75) Inventors: James Gordon Beattie, Bergenfield, NJ (US); Stephen J. Griesmer, Westfield, NJ (US); Arvind Ramdas Mallya, Walnut Creek, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 850 days.

(21) Appl. No.: 12/625,204

(22) Filed: Nov. 24, 2009

(65) Prior Publication Data
US 2011/0122246 A1 May 26, 2011

(51) Int. Cl.
| H04N 7/00 | (2011.01) |
| H04N 7/18 | (2006.01) |
| H04N 5/235 | (2006.01) |
| H04N 5/232 | (2006.01) |
| H04N 7/173 | (2011.01) |
| H04N 17/00 | (2006.01) |
| H04N 21/438 | (2011.01) |
| H04N 21/442 | (2011.01) |
| H04N 21/6543 | (2011.01) |
| H04N 21/658 | (2011.01) |

(52) U.S. Cl.
CPC ......... *H04N 7/17309* (2013.01); *H04N 17/004* (2013.01); *H04N 21/4383* (2013.01); *H04N 21/44209* (2013.01); *H04N 21/6543* (2013.01); *H04N 21/6582* (2013.01); *H04N 7/18* (2013.01); *H04N 7/183* (2013.01); *H04N 7/188* (2013.01)

(58) Field of Classification Search
USPC .............................. 348/143, 180; 725/37, 131
See application file for complete search history.

(56) References Cited

U.S. PATENT DOCUMENTS

| 5,600,368 | A * | 2/1997 | Matthews, III ............... 348/143 |
| 6,704,289 | B1 * | 3/2004 | D'Souza et al. .............. 370/252 |
| 2002/0106148 | A1 * | 8/2002 | Schemmann et al. .......... 385/24 |
| 2004/0261116 | A1 * | 12/2004 | Mckeown et al. ............ 725/109 |
| 2005/0120391 | A1 * | 6/2005 | Haynie et al. ................ 725/135 |
| 2005/0183129 | A1 * | 8/2005 | Cerami et al. ................ 725/105 |
| 2006/0222325 | A1 * | 10/2006 | Ellis .............................. 386/83 |
| 2007/0058043 | A1 * | 3/2007 | Thukral ........................ 348/180 |
| 2008/0016540 | A1 * | 1/2008 | Savoor et al. ................ 725/112 |
| 2008/0061142 | A1 * | 3/2008 | Howcroft et al. ............. 235/386 |
| 2008/0127271 | A1 * | 5/2008 | Zriny et al. ..................... 725/46 |
| 2008/0192119 | A1 * | 8/2008 | Li et al. ........................ 348/180 |
| 2008/0229257 | A1 * | 9/2008 | White .......................... 715/867 |
| 2008/0288977 | A1 * | 11/2008 | Howcroft et al. .............. 725/37 |

(Continued)

*Primary Examiner* — Jamie Atala
*Assistant Examiner* — On S Mung
(74) *Attorney, Agent, or Firm* — Guntin & Gust, PLC; Jay H. Anderson

(57) ABSTRACT

A system that incorporates teachings of the present disclosure may include, for example, a media processor having a controller to receive media content from a content provider operating in an interactive television (iTV) network, wherein the media content is associated with a plurality of channels, wherein the media content comprises audio and video content, change each channel of the plurality of channels based on a time interval provided by a monitoring system, analyze audio content of the media content for each channel for detecting an undesired condition associated with the video content, wherein the audio content is encoded by an iTV audio encoder, and transmit the media content to the monitoring system if the undesired condition is detected, the media content being transmitted for analysis by the monitoring system and for creation of a trouble ticket if a qualitative threshold for the media content is determined to not be satisfied.

20 Claims, 6 Drawing Sheets

(56) References Cited

U.S. PATENT DOCUMENTS

2009/0049485 A1* 2/2009 Agrawal et al. ................. 725/87
2009/0110284 A1* 4/2009 Lamprecht et al. ............ 382/187
2010/0153787 A1* 6/2010 Beattie et al. ................... 714/43

* cited by examiner

APPARATUS AND METHOD FOR PROVIDING A SURVEILLANCE SYSTEM

FIELD OF THE DISCLOSURE

The present disclosure relates generally to monitoring and surveillance technologies and more specifically to an apparatus and method for providing a surveillance system.

BACKGROUND

Consumers of various types of media content typically expect content and service providers to provide them with a high-quality level of service while ensuring minimal interruptions. Such media content can often include video content, audio content, text content, still image content, or combinations thereof. The media content can be delivered to the consumers via an interactive television (iTV) network, which can include internet protocol television (IPTV), interactive satellite television, and interactive cable television. Current methods for monitoring the quality of media content are typically cost-prohibitive, while also simultaneously being ineffective and inefficient.

DETAILED DESCRIPTION

One embodiment of the present disclosure can entail a media processor having a controller to receive media content from a content provider operating in an interactive television (iTV) network, wherein the media content is associated with a plurality of channels, wherein the media content comprises audio and video content, change each channel of the plurality of channels based on a time interval provided by a monitoring system, analyze audio content of the media content for each channel for detecting an undesired condition associated with the video content, wherein the audio content is encoded by an iTV audio encoder, and transmit the media content to the monitoring system if the undesired condition is detected, the media content being transmitted for analysis by the monitoring system and for creation of a trouble ticket if a qualitative threshold for the media content is determined to not be satisfied.

Another embodiment of the present disclosure can entail a method including transmitting an instruction signal to a media processor for changing a plurality of channels at a time interval and detecting an undesired condition associated with media content for each channel of the plurality of channels, wherein the media processor operates in an iTV network, receiving the media content from the media processor via a backhaul circuit if the undesired condition associated with the media content is detected, wherein the undesired condition is detected by analyzing audio content of the media content, analyzing the media content to determine if a qualitative threshold for the media content is satisfied, and generating a trouble ticket if the qualitative threshold for the media content is determined to not be satisfied.

Yet another embodiment of the present disclosure can entail a computer-readable having computer instructions to receive media content from a media content source, wherein the media content is associated with a plurality of channels, receive an instruction signal from a monitoring system for changing the plurality of channels based on a time interval, change each channel of the plurality of channels based on the time interval, analyze audio content of the media content for each channel for detecting an undesired condition associated with the media content, and transmit the media content to the monitoring system if the undesired condition is detected, the media content being transmitted to the monitoring system for determining if a qualitative threshold for the media content is satisfied.

Figure 1:
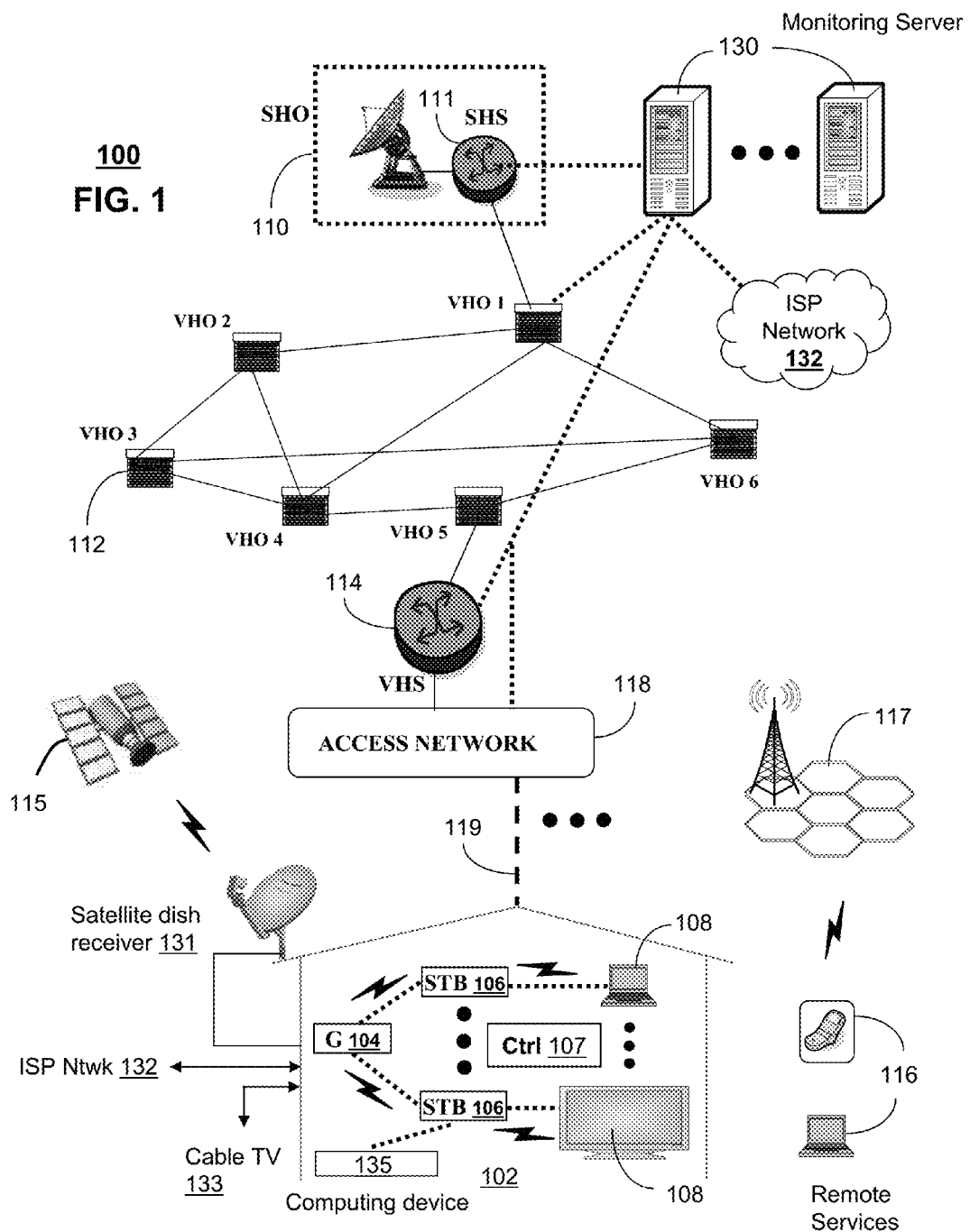
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a computing device 135. The computing device 135 can be configured to communicatively link with the STBs 106 and/or the other devices in the system 100. Additionally, the computing device 135 can be a processor, mobile device, personal computer, personal digital assistant (PDA), Universal Serial Bus (USB) device, or other similar device. Notably, the computing device 135 can be configured to include a surveillance module, which can be configured to detect undesired conditions associated with media content arriving at various devices in the system 100, such as STB 106. The media content can be video content, still image content, audio content, text content, or combinations thereof. Additionally, the media content can be iTV content, which can be a plurality of channels broadcasted to the various devices in the residential building 102.

In operation, the computing device 135 can request channel changes to each of several channels every few seconds or minutes. The interval for changing the channels can be determined by another device in the system 100 or can be set by the computing device 135 itself. The computing device 135 can analyze audio content of the media content for each channel to detect one or more undesired conditions associated with the video content, audio content, or other content included in the media content. Undesired conditions can include, but are not limited to including, a loss of packets associated with the media content, an absence of signals associated with the media content, low-quality media content, or other undesired conditions. Once an undesired condition is detected, computing device 135 can transmit the media content to another device in the system 100 for further analysis. It is important to note that the functionality provided by the computing device 135 can be fully incorporated into the STB 106 or into other devices in the system 100.

Another distinct portion of the computing devices 130 can function as a monitoring server (herein referred to as monitoring server 130). The monitoring server 130 can use common computing and communication technology to perform the function of monitoring and confirming qualitative issues associated with media content received at the devices in the system 100. In an embodiment, the monitoring server 130 can be configured to receive media content from the computing device 135 after the computing device 135 detects an undesired condition associated with media content. The media content can be received via a backhaul circuit, which can be verified by analyzing a reference channel.

The monitoring server 130 can be configured to further analyze the media content and can determine if a qualitative threshold for the content is satisfied. If not, the monitoring server 130 can trigger the creation of a trouble ticket, which can be transmitted to a processor or technician for fixing the problem. In an embodiment, the monitoring server 130 can receive substitute content from the processor or technician and transmit the content back to the devices in the residential building 102 or other devices in the system 100.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
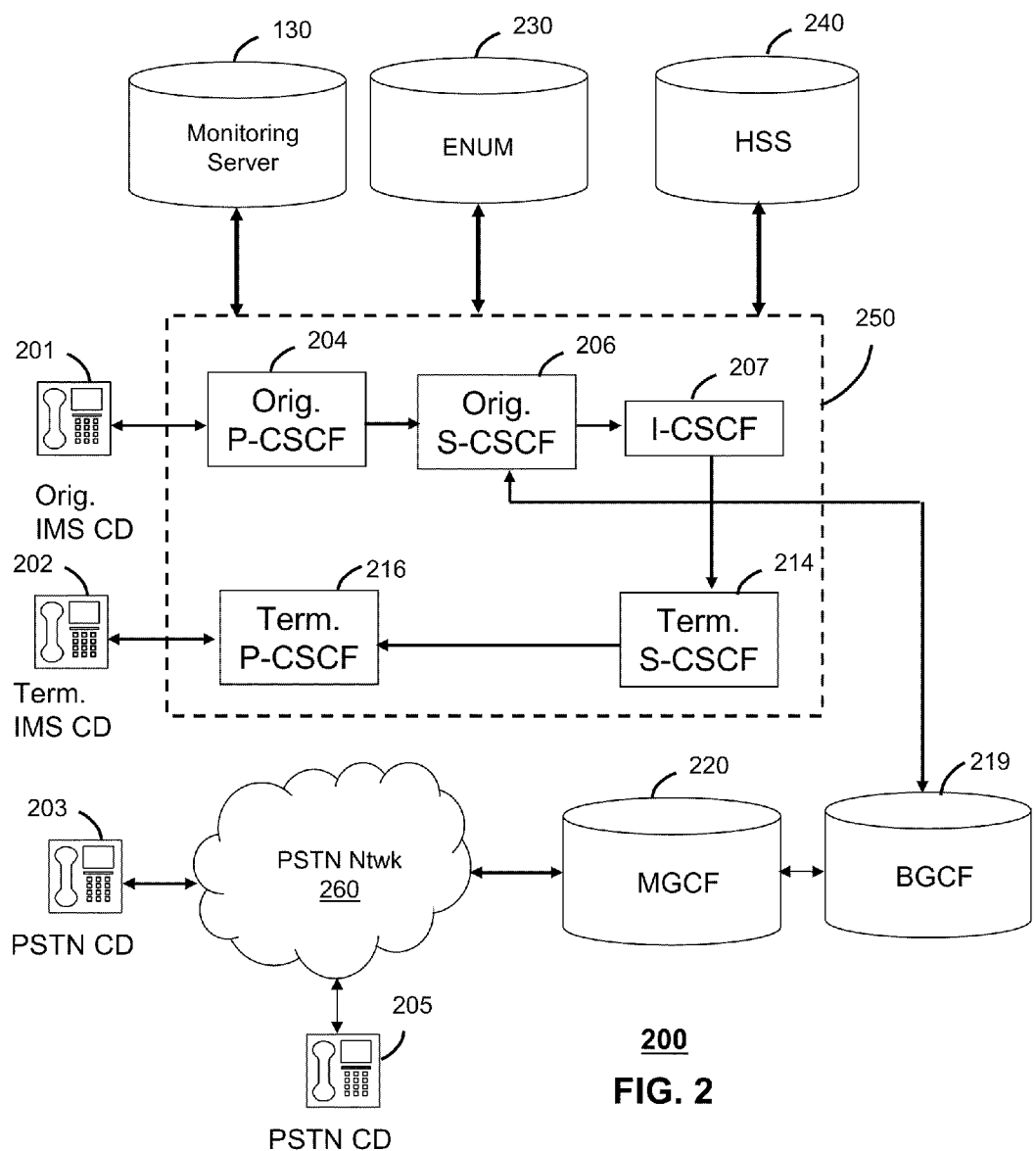

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The monitoring server 130 of FIG. 1 can be operably coupled to the second communication system 200 for purposes similar to those described above.

Figure 3:
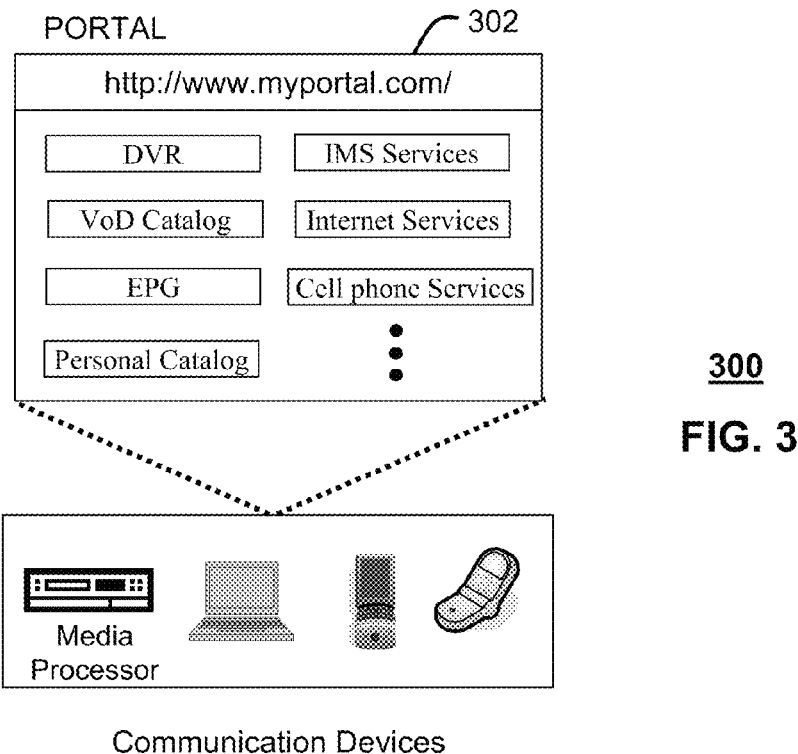
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
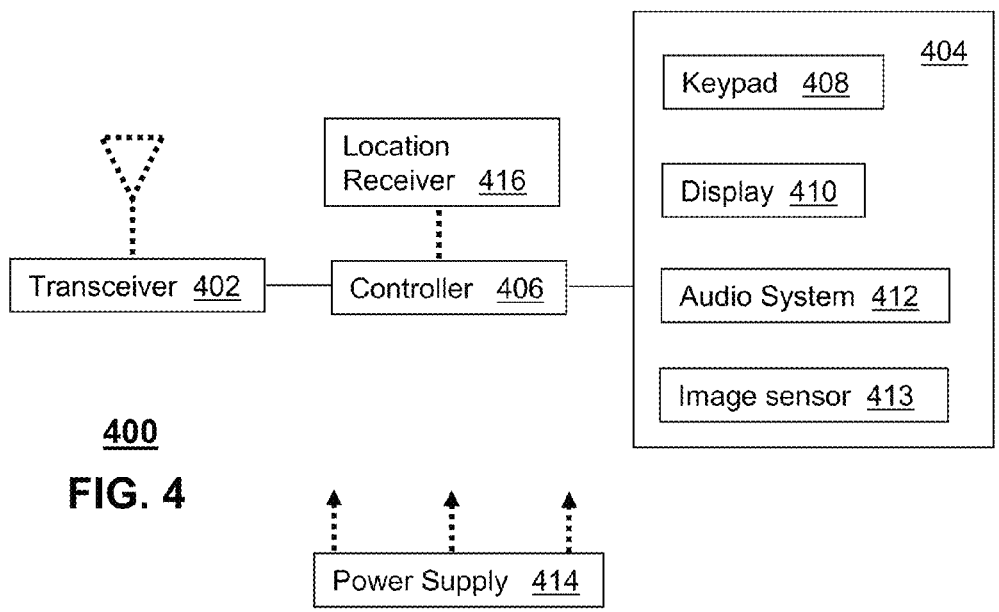
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
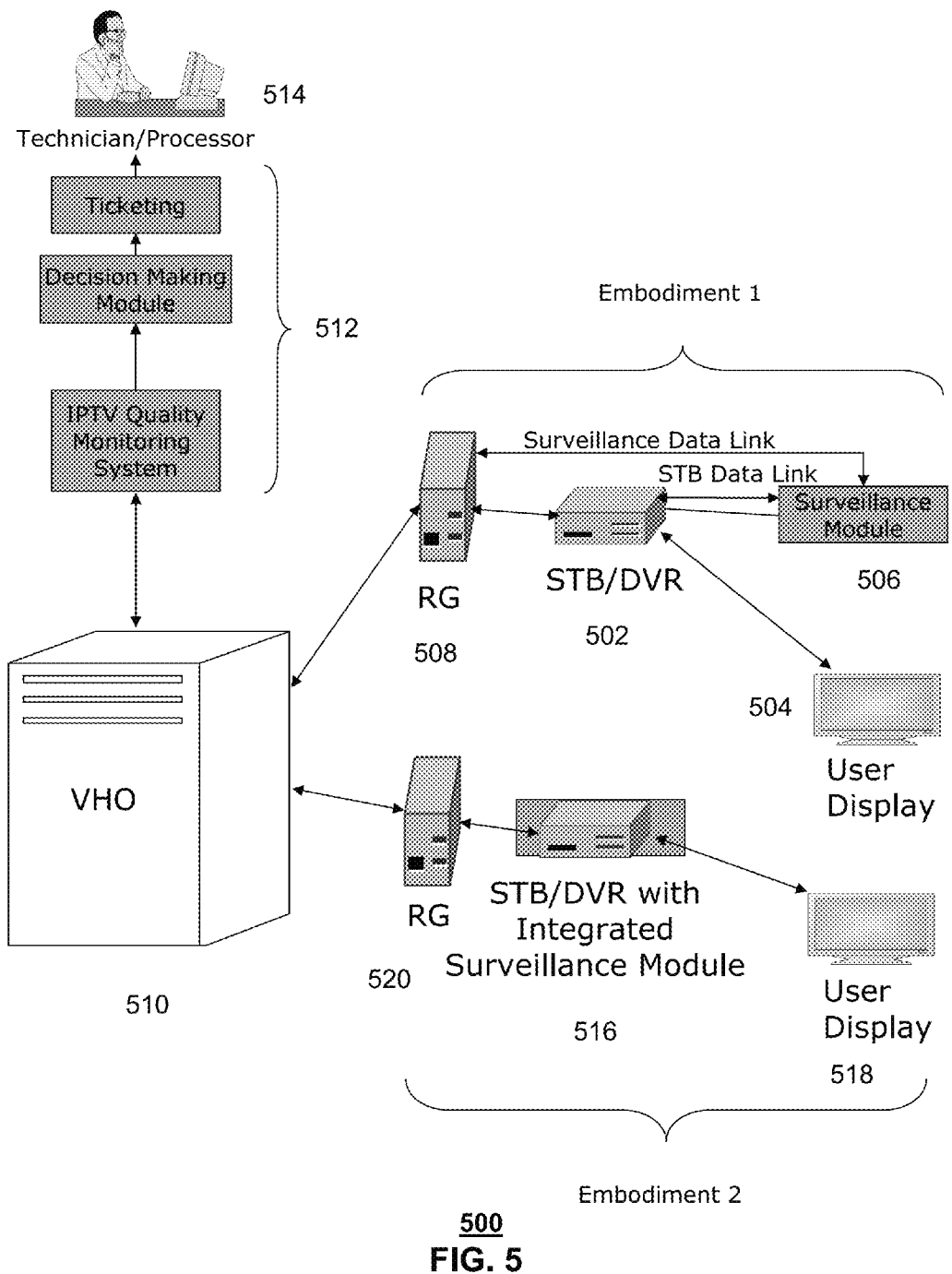
FIG. 5 depicts an illustrative embodiment of a system for providing surveillance, the system operating in the communications systems of FIGS. 1-2.

FIG. 5 depicts an illustrative embodiment of a system 500 for providing surveillance, the system 500 being operable in portions of the communications systems of FIGS. 1-2. The system 500 can be utilized to apply voice quality measurement tools found in PSTN and VoIP networks to the IPTV space. Specifically, since the majority of IPTV video and audio issues occur concurrently, such measurement tools can be focused on audio quality monitoring to assess much of the essential qualitative measurements needed to provide and assure the delivery of a high-quality level of service across a large service network. In an embodiment (embodiment 1 of FIG. 5), the system 500 can include a media processor 502, which can be configured to deliver media content to display device 504. The media processor 502 can include any device capable of displaying and/or playing media content such as STBs, DVRs, mobile devices, personal computers, and other similar devices. The system 500 can also include a computing device 506, which can include a surveillance module. Notably, the computing device 506 can operate much like computing device 135, which is described above. The computing device 506 can be communicatively linked to the media processor 502 and to a residential gateway 508.

Additionally, the system 500 can include a VHO 510, which can include the operative features and functionality of VHOs 112. The VHO 510 can be configured to receive media content associated with multiple channels from a content provider and can transmit the media content to the residential gateway 508. The media content can include video content, audio content, still image content, text content, or combinations thereof. The system 500 can also include a monitoring system 512, which can include a decision making module and can be configured to issue trouble tickets. Furthermore, the system 500 can include a technician and/or a processor 514, which can be configured to receive trouble tickets and media content from the monitoring system 512. The media content in the system 500 can be supplied by an iTV network, which can include IPTV, cable television, satellite television, and any other types of iTV. Additionally, the devices in the system 500 can be configured to operate in the iTV network.

Operatively, the VHO 510 can receive media content for a plurality of channels from a content provider and can transmit the media content to the residential gateway 508, which can then relay the channels/media content to the media processor

502. The monitoring system 512 can transmit an instruction to the media processor 502 and/or the computing device 506 via the residential gateway 508 to change each channel based on a time interval. The time interval can be a predetermined time interval or the time interval can be random. For example, a predetermined time interval can specify that the computing device 506 change channels every ten seconds. As the computing device 506 is going through each channel, the computing device 506 can utilize audio measurement tools to analyze audio content on each channel in order to detect one or more undesired conditions associated with the media content.

As noted above, undesired conditions can include, but are not limited to including, a loss of packets associated with the media content, an absence of signals associated with the media content, low-quality media content, or other undesired conditions. If undesired conditions are not detected, the computing device 506 can continue to analyze media content on the channels. However, if undesired conditions are detected, the computing device 506 and/or the media processor 502 can transmit the media content to the monitoring system 512 via a backhaul circuit or otherwise. Once the monitoring system 512 receives the media content, the monitoring system 512 can conduct further analysis on the media content. The further analysis can be performed to confirm the findings of the computing device 506.

The monitoring system 512 can be configured to analyze the media content to determine if the media content satisfies as qualitative threshold. The qualitative threshold can indicate, but is not limited to indicating, a required number of data packets, a number of lost packets, a minimum duration for a period of silence occurring in the media content, or other similar indications. For example, if the period of silence detected by the monitoring system 512 is two minutes and the qualitative threshold is one minute, the qualitative threshold is not be satisfied. If the qualitative threshold is determined to not be satisfied, the monitoring system 512 can create or trigger another device in the system 500 to create a trouble ticket, which can signify that there is a problematic issue associated with the media content on that particular channel. The trouble ticket can be transmitted to the processor 514 for processing and/or sent to a technician for review.

The processor 514 can be configured to store the trouble ticket and/or information associated with the trouble ticket. By storing each trouble ticket and other information, various causes of the problematic issues can be determined over a period of time. Additionally, as more information is stored, problematic areas in the networks associated with the media content can also be flagged. After receiving the trouble ticket, the processor 514 and/or the technician can generate substitute or replacement media content which satisfies the qualitative threshold. This substitute media content can then be transmitted to the VHO 510, which can then be relayed back to the media processor 502 for presentation. The computing device 506 can continue to analyze the media content arriving at the media processor 502 to provide continuing status information associated with the media content.

In another embodiment (embodiment 2 of FIG. 5), the functionality of the computing device 506 and surveillance module can be integrated into a media processor 516. The media content can be presented on display device 518 and can be received by the media processor 516 via residential gateway 520. In this embodiment, the functionality attributed to computing device 506 in embodiment 1 can be performed by media processor 516. In other words, media processor 516 can include the combined functionality of media processor 502 and computing device 506. The remaining operative functions described above for embodiment 1 can be similarly performed by the devices featured in embodiment 2.

Figure 6:
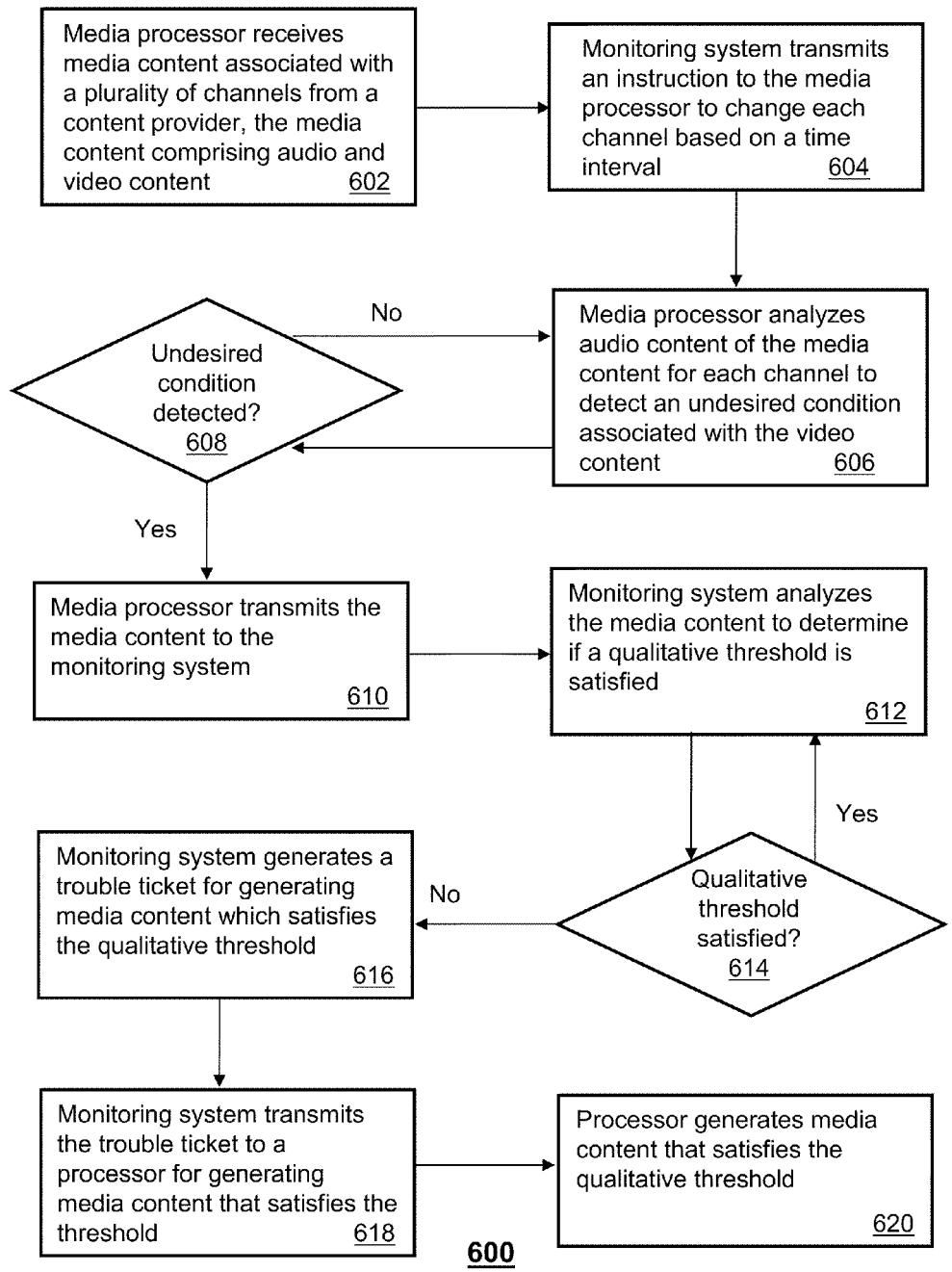
FIG. 6 depicts an illustrative embodiment of a method for providing a surveillance system, which operates in portions of the communication systems of FIGS. 1-2 and 5.

FIG. 6 depicts an illustrative method 600 for providing a surveillance system that operates in portions of the communication systems of FIGS. 1-2, and FIG. 5. Method 600 can begin with step 602 in which a media processor, such as STB 502, can receive media content from a content provider. Notably the content provider and any of the other devices according to the method 600 can be configured to operate in an iTV network, which can include IPTV, cable television, and satellite television. As mentioned above, the media content can include video content, audio content, text content, still image content, or other types of content. Additionally, the media content can include combinations of the aforementioned content. The media content can be broadcasted to the media processor through a plurality of channels.

At step 604, a monitoring system, which can include monitoring server 130 and/or monitoring system 512, can transmit an instruction to the media processor to change each channel based on a time interval. The time interval can be predetermined or random. As the media processor is changing channels, the media processor can be configured to analyze audio content of the media content for each channel to detect an undesired condition associated with video content associated with the media content or other content associated with the media content at step 606. At step 608, it can be determined whether an undesired condition has been detected based on the analysis. If no undesired condition has been detected, the media processor can continue to analyze media content on the various channels. If, however, an undesired condition is detected, the media processor can notify the monitoring system and transmit or cause to transmit the media content to the monitoring system for further analysis at step 610.

At step 612, the monitoring system can analyze the media content to determine if a qualitative threshold has been satisfied. For example, if there is an absence of a signal associated with audio content for an extended period of time or there are too many packets lost, the qualitative threshold may not be satisfied. At step 614, it can be determined if the qualitative threshold has been satisfied. If the qualitative threshold is satisfied, the monitoring system can notify the media processor that the media content conforms to qualitative thresholds and that there are no undesired conditions. Additionally, the monitoring system can notify the media processor that perhaps the media processor or other devices in communication with the media processor are not functioning properly since the media content conforms to the qualitative threshold.

However, if the qualitative threshold is not satisfied, the monitoring system can generate or cause another device to generate a trouble ticket to signify that the media content does not satisfy the qualitative threshold at step 616. At step 618, the trouble ticket can be transmitted by the monitoring system or other device to a processor or technician for further analysis and review. The processor can be configured to store the trouble ticket and can be further configured to generate substitute media content which satisfies the qualitative thresholds at step 620. The substitute media content can then be transmitted to the media processor for presentation. Notably, the method described above is not intended to be limited to the above the description and can include the operative functionality of the systems described above and any other features described below.

Upon reviewing the aforementioned embodiments, it would be evident to an artisan with ordinary skill in the art that said embodiments can be modified, reduced, or enhanced without departing from the scope and spirit of the claims described below. For example, in an embodiment, audio content analyzed by the media processor 516 and/or the computing device 506 can be fed into an audio encoder to encode the audio content. This encoded audio content can be transmitted to the monitoring system 512, which can decode the audio content for further analysis. As mentioned above, audio and video issues often occur concurrently, so that when there is a disruption in the audio portion of programming, there is a concurrent disruption in the video portion of programming. This enables monitoring using a simple, low-bandwidth audio stream as the input to a common quality surveillance device.

When there is no audio, then the decoded audio content stops or becomes intermittent, in a manner similar to what takes place when a PSTN or VoIP user channel goes silent for an extended period. In order to detect such an issue, the number of packets received from the encoder can be examined by looking for periods where no packets are arriving. In another embodiment, the media processor 516, the computing device 506, and/or the monitoring system 512 can be configured to perform level checking across a spectrum, a phase, and a harmonic distribution. In yet another embodiment, speech recognition technology can be incorporated into the systems described above. The media processor 516, the computing device 506, and/or the monitoring system 512 can be configured to determine if synchronization of a speech recognition engine was lost intermittently or for an extended period of time. If such problems are detected, the aforementioned devices can generate an alarm or other warning to indicate that a problem is occurring.

In an embodiment, one can implement multiple low-bandwidth backhaul circuits and monitor content streams simultaneously, while minimizing overhead. In another embodiment, the backhaul circuits can be verified by analyzing the backhaul circuit in light of a reference audio or other content channel. In yet another embodiment, if a trouble ticket has been issued for a particular channel, the trouble ticket can be updated after undesired conditions are no longer detected for the channel and/or after the qualitative thresholds are satisfied. Additionally, in an embodiment, the media processor 516, the computing device 506, and/or the monitoring system 512 can be configured to detect undesired conditions associated with a physical and logical topology associated with the media content. Qualitative thresholds can be examined as well.

A physical topology can include the various elements utilized in delivering the content to the media processors of the systems described above. For example, the physical topology can include servers, nodes, gateways, STBs, VHOs, and other devices typically utilized for such purposes. A logical topology can describe a particular arrangement of devices on a network and how they communicate with one another. Additionally, a logical topology can be based on communities of viewers of the media content. For example, if one community is watching a sports channel and another community is watching a travel channel, various problematic issues associated with the channels associated with these communities can also be detected. As a further illustration, the monitoring system 512 may detect that only users watching the sports channel in Atlanta are affected, whereas those users watching the sports channel in Miami are not affected. Such a conclusion, can indicate that there is no issue with the media content itself but rather there is an issue associated with the physical topology of the networks in the Atlanta area.

In an embodiment, the computing device 506, the media processor 516, and/or the monitoring system 512 can be configured to generate an alarm signal if an undesired condition is detected and/or if a qualitative threshold is not satisfied. In another embodiment, channels which frequently have undesired conditions or which frequently fail to meet the qualitative threshold can be monitored more frequently or more stringently by the devices in the systems described above.

Other suitable modifications can be applied to the present disclosure without departing from the scope of the claims below. Accordingly, the reader is directed to the claims section for a fuller understanding of the breadth and scope of the present disclosure.

Figure 7:
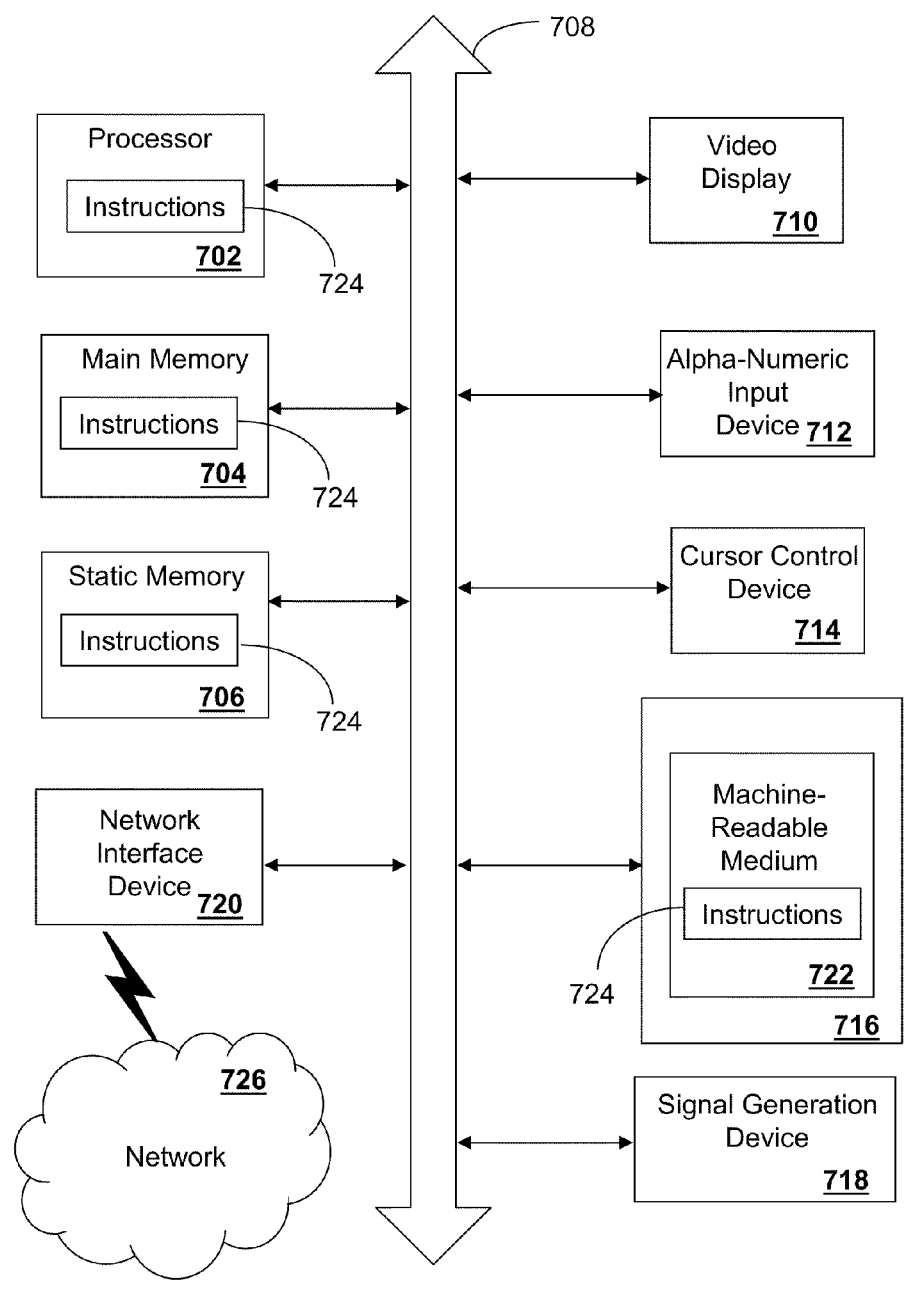
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A media processor, comprising:
a memory that stores executable instructions; and
a controller coupled to the memory, wherein the controller, responsive to executing the instructions, performs operations comprising:
receiving media content from a content provider operating in an interactive television network, wherein the media content is associated with a plurality of channels, wherein the media content comprises audio and video content;
receiving from a monitoring system an instruction, in accordance with an automated monitoring procedure, to change each channel of the plurality of channels based on a time interval, wherein the time interval is a predetermined time interval, the monitoring system accordingly monitoring each channel of the plurality of channels;
analyzing audio content of the media content for each channel in a first analysis to detect an undesired audio content quality condition, wherein the audio content is encoded by an audio encoder, wherein the analyzing comprises speech recognition by a speech recognition engine, and wherein the undesired audio content quality condition comprises a loss of synchronization of the speech recognition engine;
transmitting to the monitoring system a detection signal regarding detection of an undesired video content quality condition based on the analyzing of the audio content, the undesired video content quality condition occurring concurrently with the undesired audio content quality condition, transmitting the media content to the monitoring system for a second analysis, in accordance with the detection signal,
  wherein the monitoring system creates a trouble ticket if a qualitative threshold for the media content is determined to not be satisfied, wherein the trouble ticket signifies that the media content does not satisfy the qualitative threshold, wherein responsive to the trouble ticket substitute media content or replacement media content is provided, and
  wherein the monitoring system, responsive to determining that the qualitative threshold is satisfied, transmits a notice to the media processor indicating that the media content does satisfy the qualitative threshold and accordingly the first analysis and the second analysis are inconsistent, thereby indicating that a possible malfunction of the media processor has occurred; and
generating an alarm if the synchronization of the speech recognition engine is determined to be lost intermittently or for an extended period of time.

2. The media processor of claim 1, wherein the interactive television network comprises interactive cable television or interactive satellite television.

3. The media processor of claim 1, wherein the media processor comprises a set-top-box, a mobile device, a personal computer, a personal digital assistant, a tablet computing device, or a digital video recorder.

4. The media processor of claim 1, wherein the operations further comprise determining an undesired condition associated with text, still image, or the audio content of the media content based on analyzing the audio content.

5. The media processor of claim 1, wherein the trouble ticket is transmitted to a processor for altering the media content to satisfy the qualitative threshold, thereby generating the substitute media content.

6. The media processor of claim 1, wherein the qualitative threshold is based on an absence of a signal associated with the media content or a number of lost packets associated with the media content.

7. The media processor of claim 1, wherein the operations further comprise monitoring the media content by level checking across a spectrum, a phase, and a harmonic distribution.

8. A method, comprising:
  transmitting, by a system, an instruction signal to a media processor to change each channel of a plurality of channels at a time interval in accordance with an automated monitoring procedure, wherein the time interval is a random time interval, and wherein the media processor operates in an interactive television network;
  analyzing, by the system, audio content included in media content for each channel of the plurality of channels in a first analysis to detect an undesired audio content quality condition, wherein the analyzing comprises speech recognition by a speech recognition engine, and wherein the undesired audio content quality condition comprises a loss of synchronization of the speech recognition engine;
  receiving, by the system, the media content from the media processor via a backhaul circuit if an undesired video content quality condition associated with video content included in the media content is detected, wherein the undesired video content quality condition is detected by the analyzing of the audio content to detect the undesired video content quality condition occurring concurrently;
  analyzing, by the system, the media content in a second analysis to determine if a qualitative threshold for the media content is satisfied; and
  generating, by the system, a trouble ticket if the qualitative threshold for the media content is determined to not be satisfied, wherein the trouble ticket signifies that the media content does not satisfy the qualitative threshold, wherein responsive to the trouble ticket substitute media content or replacement media content is provided;
  generating, by the system, a notice to the media processor if the qualitative threshold for the media content is determined to be satisfied, wherein the notice indicates that the media content does satisfy the qualitative threshold and accordingly the first analysis and the second analysis are inconsistent, thereby indicating that a possible malfunction of the media processor has occurred; and
  generating, by the system, an alarm signal if the synchronization of the speech recognition engine is determined to be lost intermittently or for an extended period of time.

9. The method of claim 8, comprising analyzing, by the system, the backhaul circuit by utilizing a reference channel.

10. The method of claim 8, comprising transmitting, by the system, the trouble ticket to a processor for generating and transmitting to the media processor the substitute media content, wherein the substitute media content satisfies the qualitative threshold.

11. The method of claim 8, comprising updating, by the system, the trouble ticket if the undesired condition is not detected or the qualitative threshold is satisfied.

12. The method of claim 8, comprising determining, by the system, undesired conditions associated with a physical or a logical topology associated with the media content.

13. The method of claim 8, wherein the qualitative threshold is based on an absence of a signal associated with the media content or a number of lost packets associated with the media content.

14. The method of claim 8, comprising generating, by the system, the alarm signal if the qualitative threshold is not satisfied.

15. A non-transitory machine-readable storage device, comprising executable instructions which, responsive to being executed by a processor, cause the processor to perform operations comprising:
  receiving media content from a media content source, wherein the media content is associated with a plurality of channels;
  receiving an instruction signal from a monitoring system to change each channel of the plurality of channels in accordance with an automated monitoring procedure and based on a time interval, wherein the time interval includes a predetermined time interval, the monitoring system accordingly monitoring each channel of the plurality of channels;
  changing each channel of the plurality of channels based on the time interval;
  analyzing audio content of the media content for each channel in a first analysis to detect an undesired audio content quality condition, wherein the analyzing comprises speech recognition by a speech recognition engine, and wherein the undesired audio content quality condition comprises a loss of synchronization of the speech recognition engine;
  detecting an undesired video content quality condition based on the analyzing of the audio content, the undesired video content quality condition occurring concurrently with the undesired audio content quality condition, transmitting the media content to the monitoring system responsive to detection of the undesired condition, the media content being transmitted to the monitoring system for determining in a second analysis if a qualitative threshold for the media content is satisfied;

generating a trouble ticket if the qualitative threshold for the media content is determined to not be satisfied, wherein the trouble ticket signifies that the media content does not satisfy the qualitative threshold, wherein responsive to the trouble ticket substitute media content or replacement media content is provided;

generating a notice if the qualitative threshold for the media content is determined to be satisfied, wherein the notice indicates that the media content does satisfy the qualitative threshold and accordingly the first analysis and the second analysis are inconsistent, thereby indicating that a possible malfunction of the processor has occurred; and generating an alarm if the synchronization of the speech recognition engine is determined to be lost intermittently or for an extended period of time.

16. The non-transitory machine-readable storage device of claim 15, wherein the operations further comprise feeding the audio content into an audio encoder for encoding after detecting the undesired condition, wherein the audio content that is encoded is decoded by the monitoring system.

17. The non-transitory machine-readable storage device of claim 15, wherein the operations further comprise determining an undesired condition of still image or text content of the media content based on the analyzing of the audio content.

18. The non-transitory machine-readable storage device of claim 15, wherein the operations further comprise receiving the substitute media content if the qualitative threshold is not satisfied.

19. The non-transitory machine-readable storage device of claim 15, wherein the operations further comprise determining undesired conditions associated with a physical or a logical topology associated with the media content.

20. The method of claim 8, further comprising transmitting the trouble ticket to a technician for review.

* * * * *